United States Patent
Liu

(10) Patent No.: US 6,368,243 B1
(45) Date of Patent: Apr. 9, 2002

(54) BIKE INNER DERAILLEUR

(76) Inventor: Jen-chih Liu, 2F., No. 468, Chien Kuo 1 Road, Kaohsiung (TW)

(*) Notice: Subject to any disclaimer, the term of this patent is extended or adjusted under 35 U.S.C. 154(b) by 0 days.

(21) Appl. No.: 09/603,112

(22) Filed: Jun. 22, 2000

(51) Int. Cl.[7] ............................. F16H 3/70; F16H 59/64
(52) U.S. Cl. ................ 475/298; 475/296; 192/217.4; 74/337.5
(58) Field of Search ................. 475/296, 298, 475/275; 192/217.4; 74/337.5

(56) References Cited

U.S. PATENT DOCUMENTS

| | | | |
|---|---|---|---|
| 5,273,500 A | * 12/1993 | Nagano | 475/296 X |
| 5,562,563 A | * 10/1996 | Shoge | 475/298 |
| 5,964,678 A | * 10/1999 | Hanada et al. | 475/298 X |
| 5,967,937 A | * 10/1999 | Matsuo | 475/298 X |
| 6,258,005 B1 | * 7/2001 | Rohloff | 475/277 |

FOREIGN PATENT DOCUMENTS

GB          2207966      * 2/1989

* cited by examiner

Primary Examiner—Charles A. Marmor
Assistant Examiner—Ha Ho
(74) Attorney, Agent, or Firm—Pro-Techtor International Services

(57) ABSTRACT

A bike inner derailleur has manifold stages of speed alteration, including a flat projecting wheel rotatable to produce angle change, plural control rods fitted on a fix shaft and moved by the flat projecting wheel, and the fix shaft is fitted in a hollow center interior of a wheel hub. Then selecting a rotating angle of the flat projecting wheel may operate to changeover detents of single direction provided in an input route formed between a power input source and a power output source through at least one or more control rods moving horizontally. Further, an intermediate ring is provided between two planetary gear groups, operated to changeover the detents for selecting manifold power transmitting routes.

10 Claims, 8 Drawing Sheets

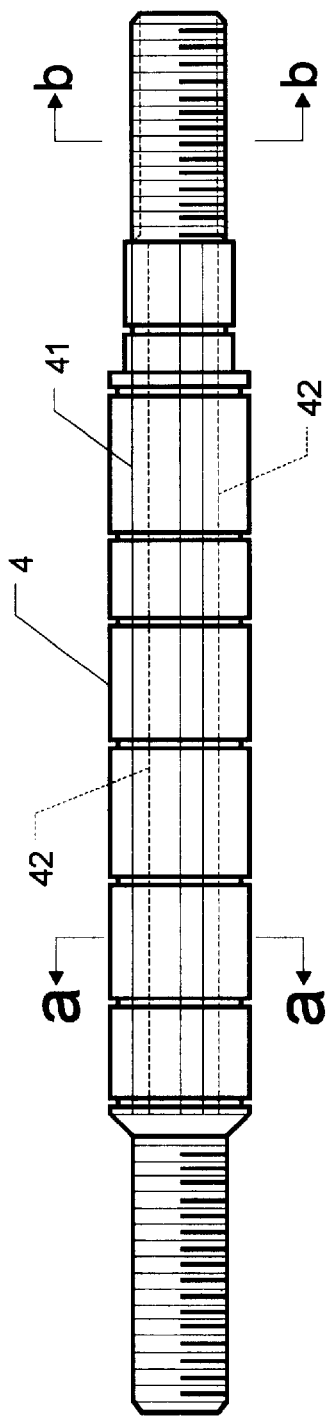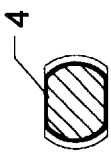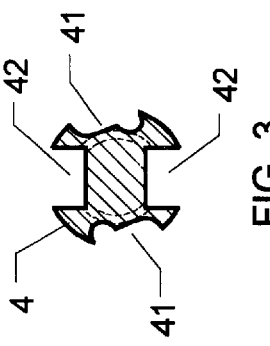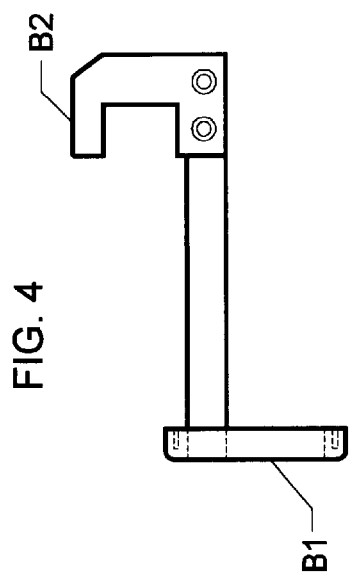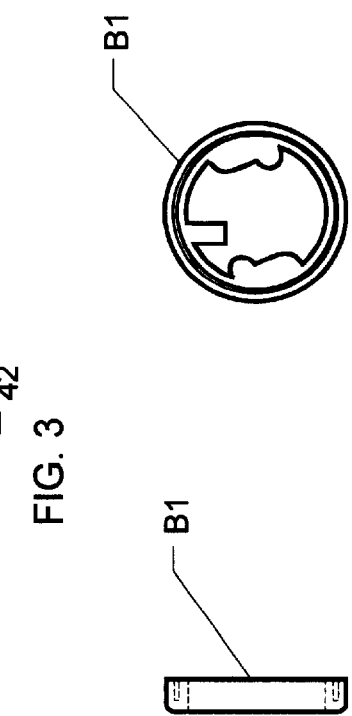
FIG. 2
FIG. 3
FIG. 4
FIG. 5
FIG. 6
FIG. 7

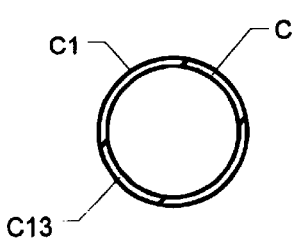
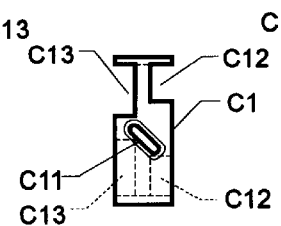
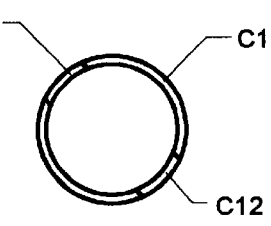
FIG. 9    FIG. 8    FIG. 10
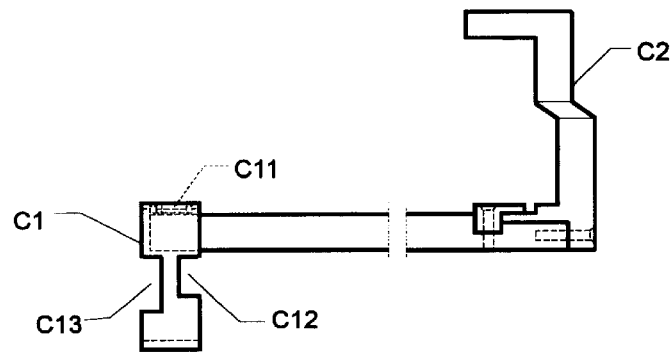
FIG. 11
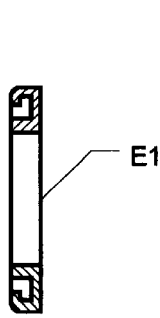
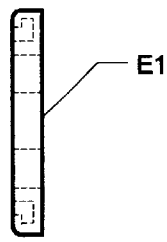
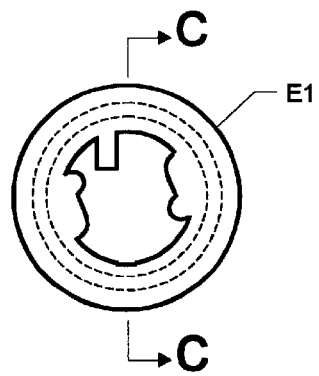
FIG. 14    FIG. 13    FIG. 12
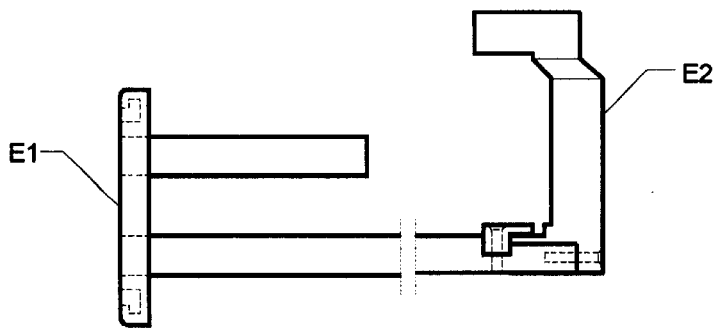
FIG. 15

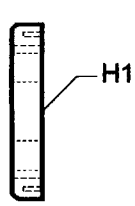
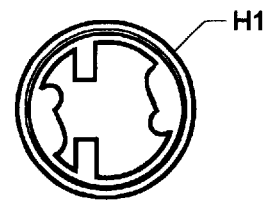
FIG. 17    FIG. 16
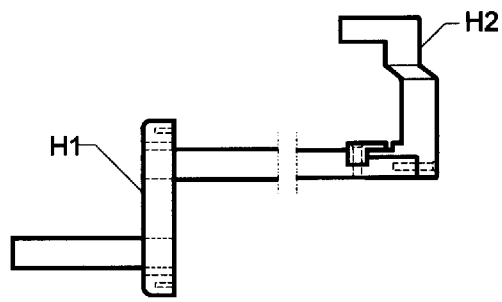
FIG. 18
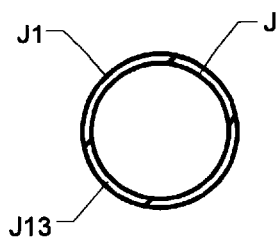
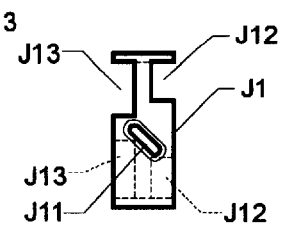
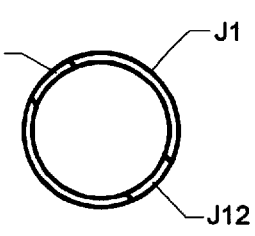
FIG. 20    FIG. 19    FIG. 21
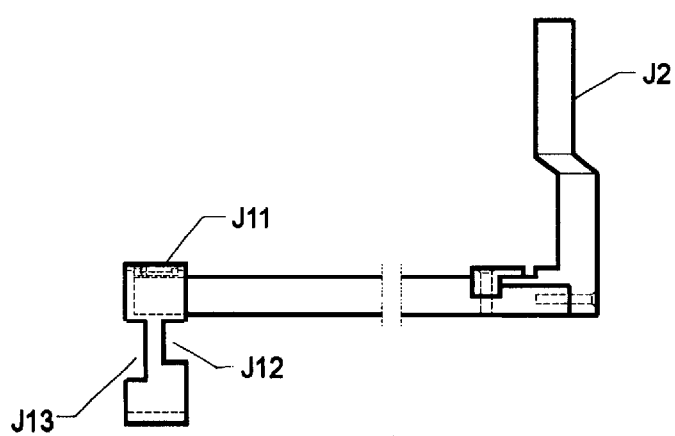
FIG. 22

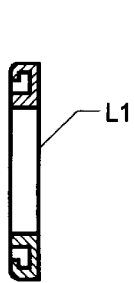
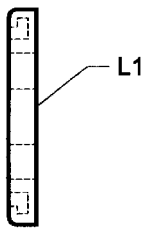
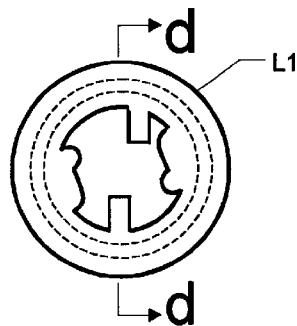
FIG. 25      FIG. 24      FIG. 23
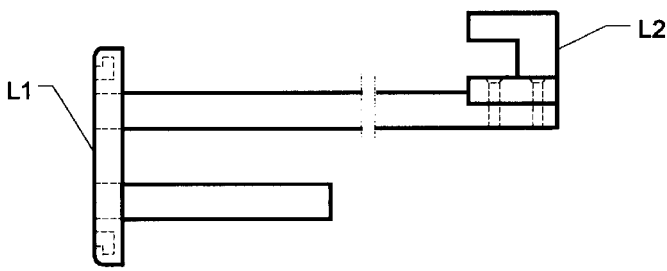
FIG. 26
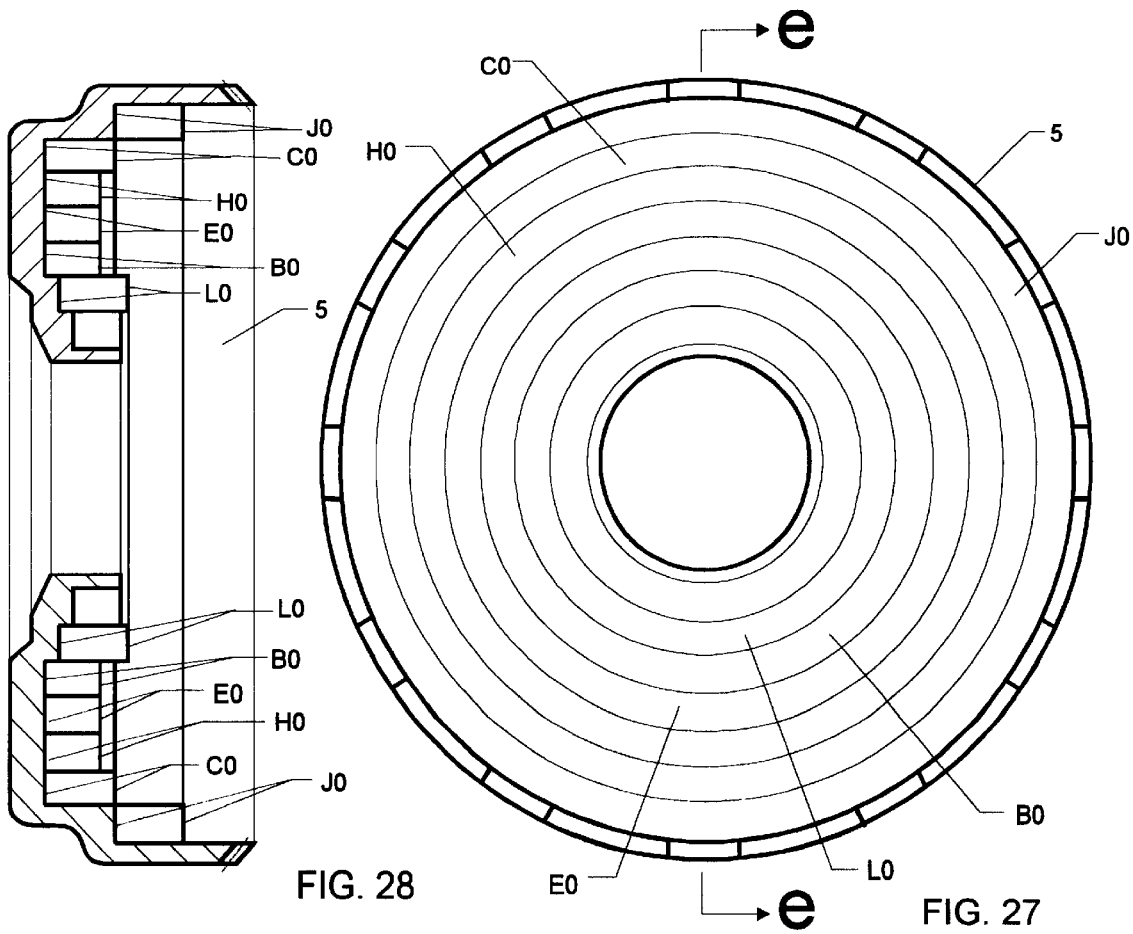
FIG. 28        FIG. 27

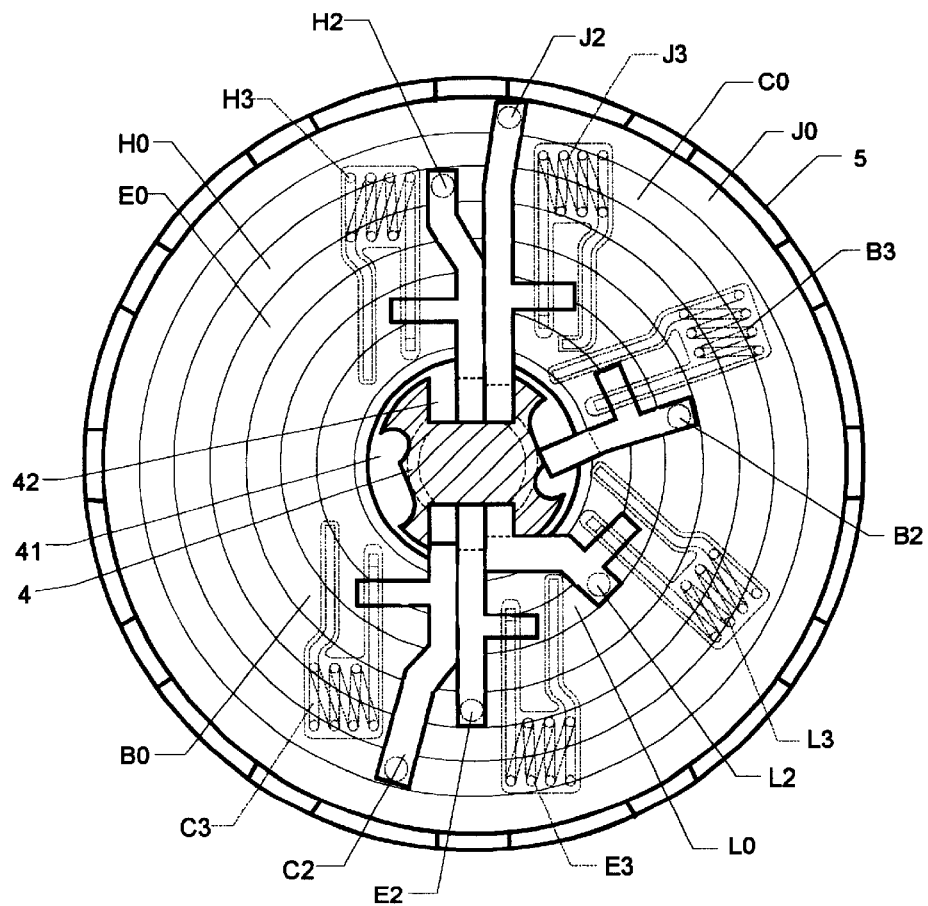
FIG. 29
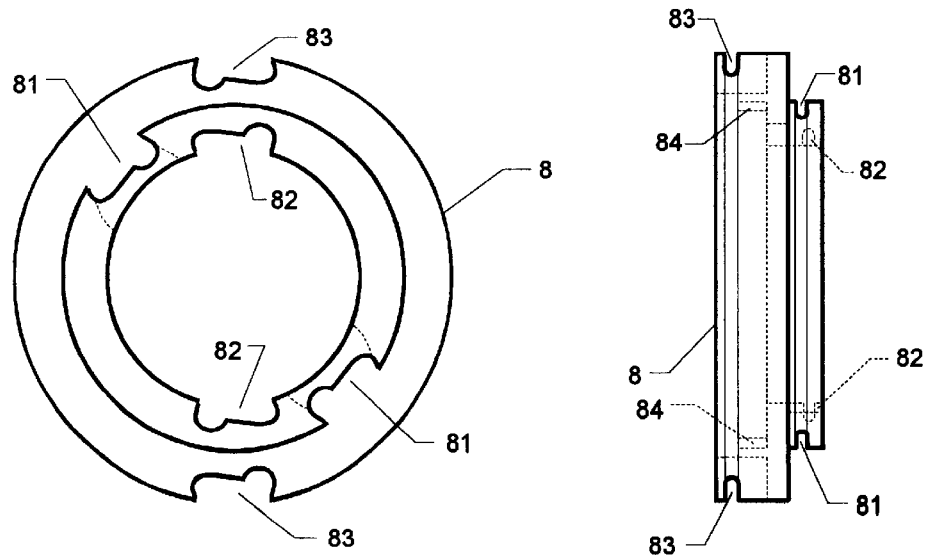
FIG. 32
FIG. 33

BIKE INNER DERAILLEUR

BACKGROUND OF THE INVENTION

This invention relates to a bike inner derailleur, particularly to one having a simple structure, easy to handle, a wide speed changing scope, a small dimensions, and a lightweight.

A bike inner derailleur is a speed changing structure installed in a wheel hub, achieving speed changing and saving time and force by means of gear proportion of the gears groups therein and choosing transmitting routes of the gear proportions. A conventional bike inner derailleur includes a planet gear group, a power input source, crutches in a single direction, a power stopping structure and springs, related input and output rods, etc. Utilizing the power source input and choosing the power transmission routes can obtain at least one or more different speed proportion outputs. The idea of the planet gear groups was disclosed as early as in 1880, and a sun gear was added to the planet gear group in 1895, for driving a bike, and in 1896 a really commercialized inner derailleur was disclosed, having a lever for controlling control rods fixed in a hollow rod and sliding movement of the sun gear for acquiring different speed proportions. So far conventional inner derailleurs have been made to have three, four, five, seven and twelve speeds, and an outer derailleur of seven speeds and an inner derailleur of three speeds.

As to the inner derailleur for bikes, many patents have been disclosed in U.S. Pat. Nos. 4,842,291, 4,854,191, Re.33058, 4,947,703, 4,973,297, 5,011,464, 5,069,655, 5,078,664, 5,083,991, 5,236,403, 5,273,500, 5,273,501, 5,318,486 5,322,487, 5,378,201, 5,399,128, 5,443,279, 5,445,573, 5,469,755, 5,527,230, 5,556,354, 5,540,456, 5,556,354, 5,590,894, 5,769,750, 5,785,625, 5,829,563, 5,833,040, etc.

In general, an inner derailleur disclosed in those cases has a narrow scope for weight, dimensions, and speed proportion, not adaptable for race bikes or mountaineering ones, almost used in cities for going to work, for bikes with a motor, and collapsible bikes. It has a complicated structure, many components, a heavy weight, a large dimension, and a limited scope of speed proportion selection. In technological principle, they have used planet gear groups of a little modification, and have different designs in the control structures and the gear transmission.

The technological bottleneck at present lies in making a bike inner derailleur of a simple structure, an easy operation, a wide speed proportion scope, small dimensions, and a light weight.

SUMMARY OF THE INVENTION

This invention has been devised to offer a bike inner derailleur of a simple structure, having a wide speed change scope, small dimensions, and a light weight.

The feature of the invention is a flat projecting wheel provided with a plurality of annular grooves of the same center and a plurality of control rods. A certain angle rotation of the flat projecting wheel can move at least one or more of the control rods, to operate single direction clutches (or detents) of the speed changing structure.

Comparatively many control rods are fixed around on a circular outer surface of a fix shaft for producing a more speed proportion scope. In addition, an intermediate ring is provided between two gear groups for producing manifold power transmitting routes for selection so that a bike inner derailleur may have a simple structure, a small dimensions, a light weight, and easy to handle in selecting one of many speeds. The Figures show an embodiment of a bike inner derailleur having 13 stages of speed proportion outputs.

BRIEF DESCRIPTION OF DRAWINGS

This invention will be better understood by referring to the accompanying drawings, wherein:

FIG. 2 is a side view of a fix rod in the present invention;

FIG. 3 is a cross-sectional view of the line a—a in FIG. 2;

FIG. 4 is a cross-sectional view of the line b—b in FIG. 2;

FIG. 5 is a front view of a first sleeve (B1) in the present invention;

FIG. 6 is left side view of FIG. 5;

FIG. 7 is a side view of the first sleeve (B1) combined with a first control rod (B2) in the present invention:

FIG. 8 is a front view of a second sleeve (C1) in the present invention;

FIG. 9 is a left side view of FIG. 8;

FIG. 10 is a right side view of FIG. 8;

FIG. 11 a side view of the second sleeve (C1) combined with a second control rod (C2) in the present invention;

FIG. 12 is a front view of a third sleeve (E1) in the present invention;

FIG. 13 is a left side of FIG. 12;

FIG. 14 is a cross-sectional view of the line c—c in FIG. 12;

FIG. 15 is a side view of the third sleeve (E1) combined with a third control rod (E2) in the present invention;

FIG. 16 is a front view of a fifth sleeve (H1) in the present invention;

FIG. 17 is a left side view of FIG. 16;

FIG. 18 is a side view of the fifth sleeve (H1) combined with a fifth control rod (H2) in the present invention;

FIG. 19 is a front view of a fourth sleeve (J1) in the present invention;

FIG. 20 is a left side view of FIG. 19;

FIG. 21 is a right side view of FIG. 19;

FIG. 22 is a side view of the fourth sleeve (J1) combined with a fourth control rod (J2) in the present invention;

FIG. 23 is a front view of a sixth sleeve (L1) in the present invention;

FIG. 24 is a left side view of FIG. 23;

FIG. 25 is a left side view of the line d—d in FIG. 23;

FIG. 26 is a side view of the sixth sleeve (L1) combined with a sixth control rod (L2) in the present invention;

FIG. 27 is a front view of a flat projecting wheel in the present invention;

FIG. 28 is a cross-sectional view of the line e—e in FIG. 27;

FIG. 29 is a front view of the control rods distributed on the flat projecting wheel in the present invention;

FIG. 32 is a front view of an intermediate ring in the present invention;

FIG. 33 is a right side view of FIG. 32.

DETAILED DESCRIPTION OF THE PREFERRED EMBODIMENT

Figure 1:
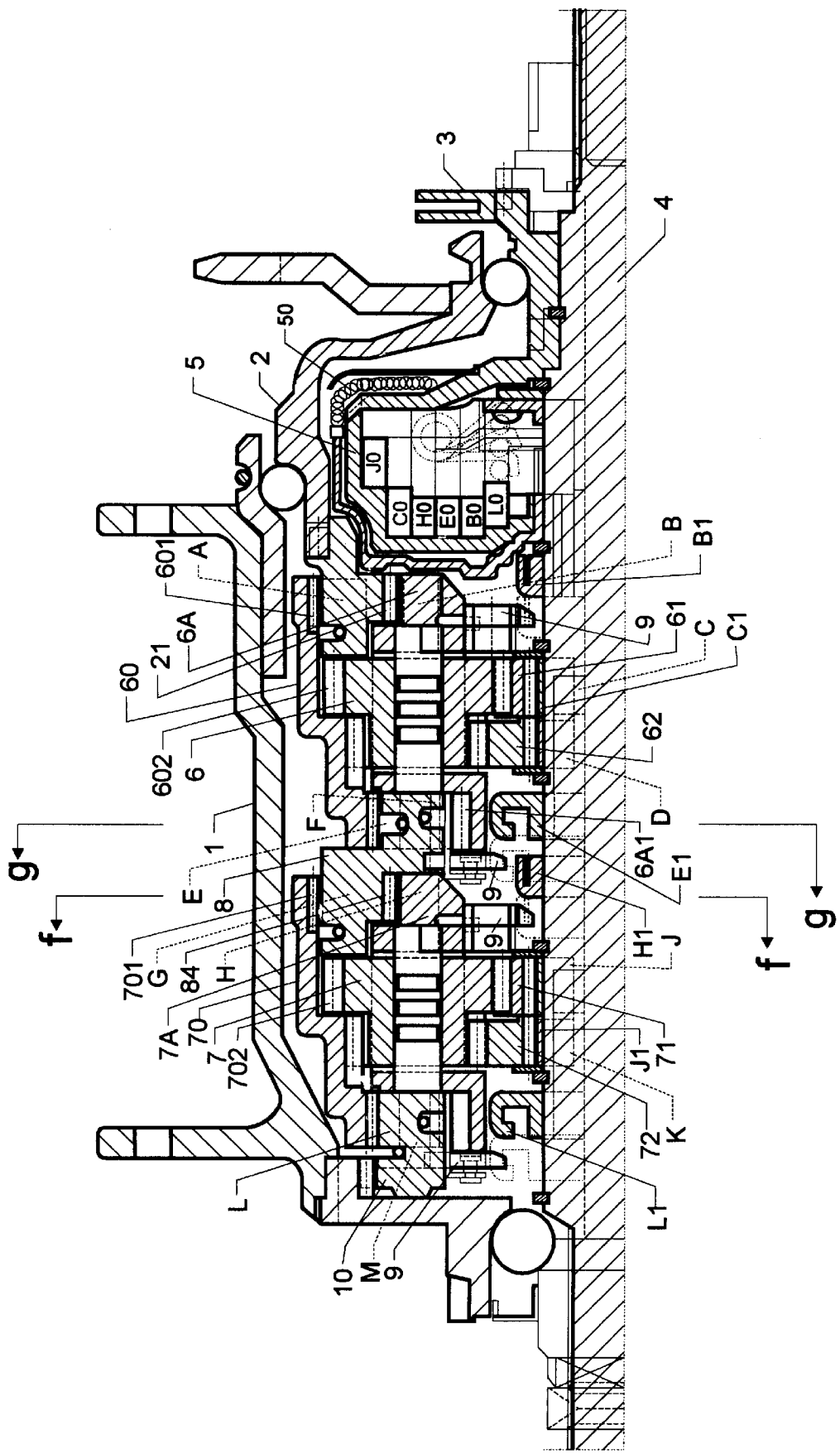
FIG. 1 is a cross-sectional view of a bike inner derailleur in the present invention.
Figure 34:
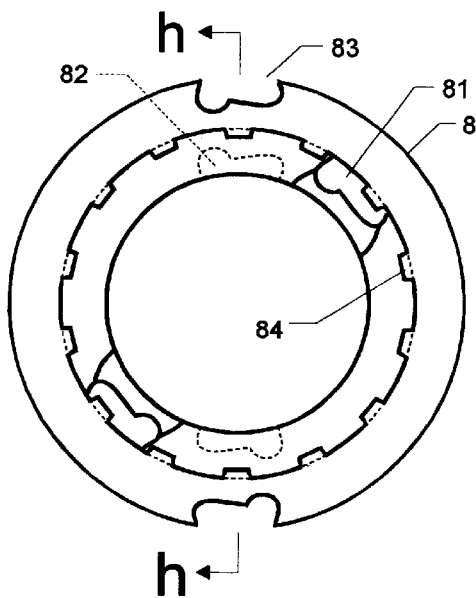
FIG. 34 is a rear view of FIG. 32; and,
FIG. 35 is a cross-sectional view of the line h—h in FIG. 34.
Figure 35:
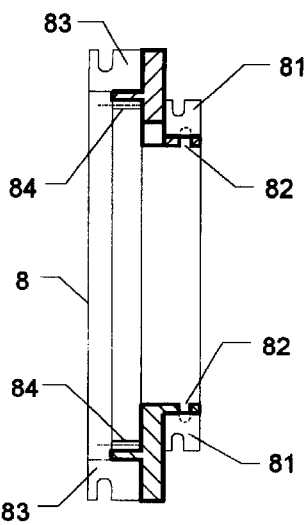
Figure 30:
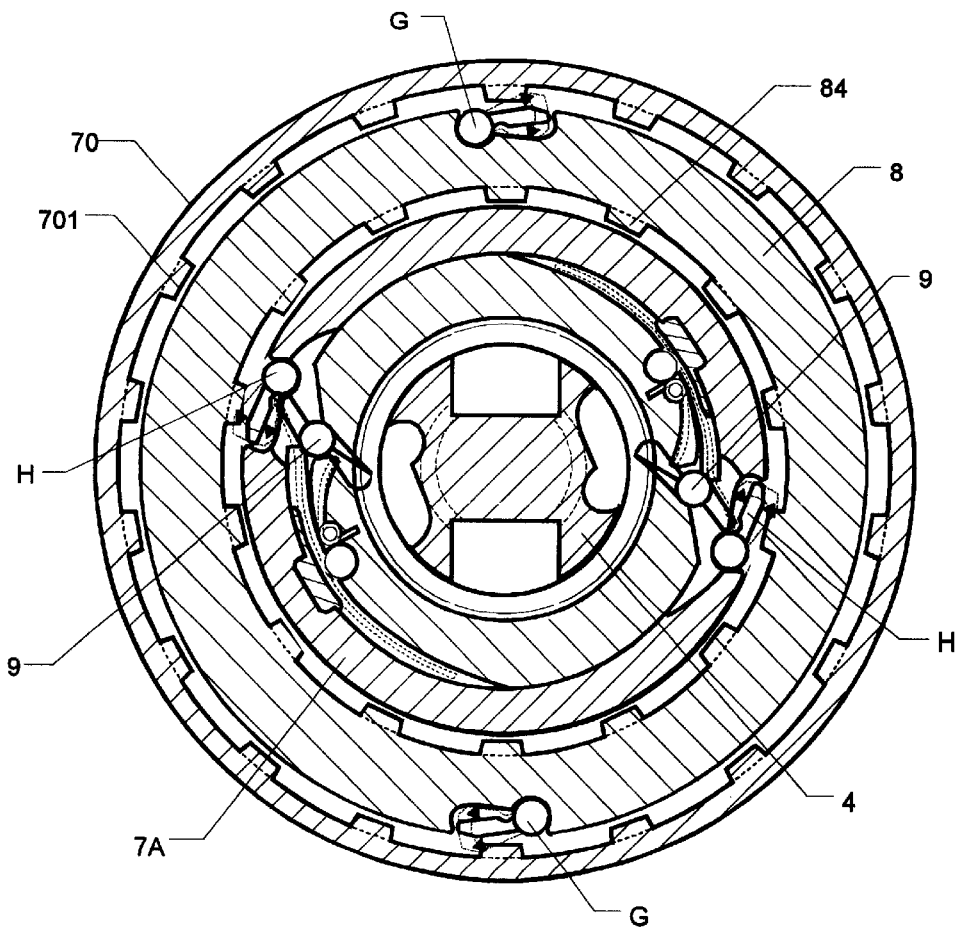
FIG. 30 is a cross-sectional view of the line f—f in FIG. 1.
Figure 31:
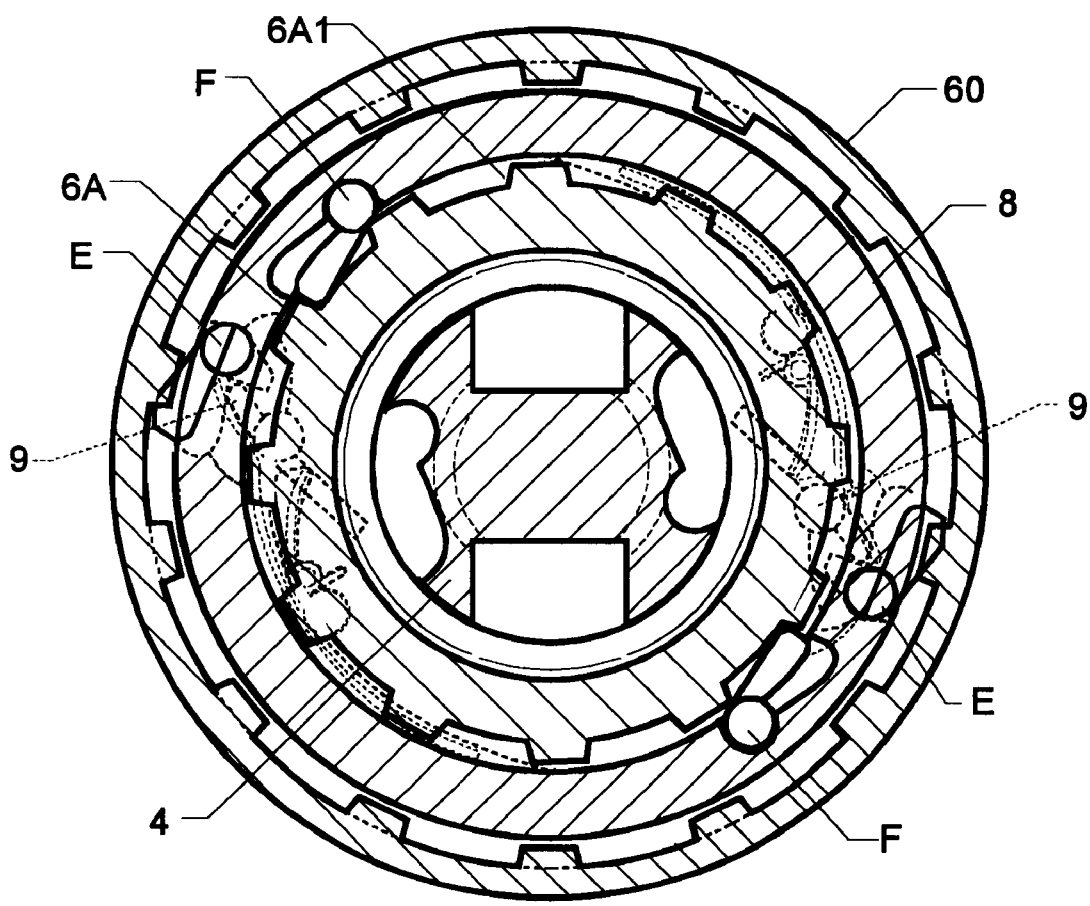
FIG. 31 is a cross-sectional view of the line g—g in FIG. 1.

A preferred embodiment of a bike inner derailleur in the present invention, as shown in FIG. 1, includes a wheel hub (1), a power input driving means (2), a speed changing driving means (3), a fix shaft (4), a flat projecting wheel 5, a first planetary gear group (6), a first internal gear (60), a second planetary gear (7), a second internal gear (70), and an intermediate ring (8) as main components combined together.

The wheel hub 1 has a hollow center interior for the fix shaft (4) to fit longitudinally therein to rotate with the fix shaft (4) as a pivot, two pairs of two sun gears (61), (62) and (71), (72) are fitted around the fix shaft (4). The first and the second planetary gear groups (6) and (7) are positioned around outer circumferential edges of the first and the second sun gears (61), (62) and (71), (72) and rotate with the fix shaft as pivot. The planetary gears of the first planetary gear group (6) engage the first sun gear group (61), (62), and the planetary gears of the second planetary gear group (7) engage the second pair of the sun gears (71), (72). Further, the first internal gear (60) and the second internal gear (70) are respectively positioned around an outer periphery of the first and the second planetary gear groups (6) and (7), and then the intermediate ring (8) for transmitting power is positioned between the first planetary gear group (6) with the first internal gear (60) and the second planet gear group (7) with the second internal gear (70).

The power input driving means (2) and the speed change driving means (3) are deposited at one side of the wheel hub (1), and the output end of the power input driving means (3) is located at the input end of a first planetary gear frame (6A) and the input end of the first internal gear (60). The output end of the power input driving means (2) has a single direction detent on its outer edge, engaging an engage section (601) at the input end of the first internal gear (60), and an engage section (21) formed on an inner edge of the output end to engage a single direction second detent (B) formed at the input end of the first planetary gear frame (6A). The second detent (B) is moved by a snap finger (9), which is controlled by a first sleeve (B1) fitted around the fix shaft 4 to move horizontally. When the first sleeve (B1) moves horizontally, the snap finger (9) moves the second detent (B) into an OFF condition, in other words, the second detent (B) separates from the engage section (21) of the power input driving means (2). The movement of the sleeve (B1) is carried out by the first control rod (B2), as shown in FIGS. 5–7, and a second end of the first control rod (B2) flatly contacts an annular groove (B0) of plural annular grooves of the same center, as shown in FIG. 29. Further a first spring (B3) pulls the second end of the control rod (B2) to closely contact and move along the first annular groove (B0), which has a mixed high-and-low surface for the second end of the first control rod (B2) to move horizontally. The flat projecting wheel (5) is rotated by the speed change driving means (3) to alter a rotating angle of the flat projecting wheel (5).

A first control rod (B2) is fitted around the fix shaft (4), moving horizontally, and the fix shaft (4) has at least two detent grooves (41) and one recessed combining groove (42) for all the control rods to be fitted around on the fix shaft 4 to move horizontally.

The first internal gear (20) has annular inner teeth (602) engaging a low stage teeth surface of the planetary gears, and an output end facing the outer edge of the input end of the intermediate ring (8), and the both are controlled by a fifth detent (E). The first planetary gear group (6) has their planetary gears provided with a high and a low stage teeth surface respectively engaging the first pair of the sun gears (61), (62), and the small sun gear 61 is controlled by the third detent (C), and the large sun gear (62) by the fourth detent (C). When the small sun gear (61) is fixed in its position by the third detent (C), the large sun gear rotates quickly, and the fourth and the third detent (D) and (C) are oriented in the clockwise direction. So if the third detent (C) of the small sun gear (61) is ON, the fourth detent (D) of the large sun gear 62 does not function (i.e. the large sun gear is rotating), and thus only controlling the third detent (C) can select different speed proportion. The third detent (C) is controlled to become ON or OFF by rotating angle alteration of the second sleeve (C1), with one end of the second rod (C1) hooking a sloped groove (C11) of the second sleeve (C1). Then horizontal movement of the second control rod (C2) forces the second sleeve (C1) to rotate by means of the sloped groove (C11), with a small notch (C12) at one side of the second sleeve (C1) moving down to press down the third detent (C) to become OFF, and with a large notch (C13) at the other side of the second sleeve (C1) forcing the fourth detent (C) become always ON. The second control rod (C2) is combined on an outer surface to move horizontally, having a second end pulled by a second spring (C3) to closely contact and move along a second annular groove (C0), which has a mixed high and low surface for the second control rod (C2) to move horizontally.

The gear frame (6A) of the first planetary gear group (6) has an engage section (6A1) formed on an outer edge of the output end to face a sixth detent (F) of a single direction. A fifth detent (E) is provided between the outer edge of the input end of the intermediate ring (8) and the output end of the first internal gear (60), moved by a third sleeve (E1) by means of a snap finger (9), and the third sleeve (E1) is moved horizontally by a third control rod (E2), having a first end connected on the third sleeve (E1) and a second end pulled by a third spring (E3) to closely contact and move along a third annular groove (E0) of plural annular grooves of the same center, and the third annular groove (E0) has a mixed high and low surface for the third control rod to move horizontally.

The intermediate ring (8), as shown in FIGS. 32–35, has a detent combining groove (81) on an outer edge of the input end, and the fifth detent (E) is controlled by the third sleeve (E1) to become ON or OFF at the output end of the first internal gear (60). Further, the intermediate ring (8) has a detent groove (82) in an inner edge to let a sixth detent (F) to engage the engage section (6A1) of the output end of the first planetary gear frame (6A) according to OFF and ON of the fifth detent (E). The outer edge of the output end of the intermediate ring (8) has an engage groove (83) to engage and move a seventh detent (G) of an engage section (710) of the input end of the second internal gear 70, and the inner edge of the output end has an engage section (84) engage and move an eighth detent (H) of the input end of the second planetary gear frame (7A).

The second planetary gear groups (7) are located in a hollow interior of the second internal gear (70), and the gear group frame (7A) has the eighth detent (H) formed on the input end and controlled by the fifth sleeve (H1) through the snap finger (9). The eighth detent (H) is moved horizontally by the fifth control rod (H2), which has one end connected to the fifth sleeve (H1) and the other end pulled by a fifth spring (H3) to closely contact and move horizontally on a fifth annular groove (H0) having a mixed high and low surface on the flat projecting wheel (5). When the fifth sleeve (H1) moves to activate the snap finger (9) to alter the fifth detent (H) to OFF, the seventh detent (G) becomes ON. But if the eighth detent (H) is ON, the seventh detent (G) becomes OFF.

The second internal gear (70) has inner annular teeth (702) engaging the low stage teeth surface of the planetary gears of the second planetary gear groups (7), and the output end provided with an engage section facing an eleventh detent (L) formed on an outer edge of the power output means (10). The eleventh detent (L) is controlled by a sixth sleeve (L1) through the snap finger (9), and the sixth sleeve (L1) is connected to one end of the sixth control rod (L2) having the other end pulled by a sixth spring (L3) to closely contact and move horizontally along a mixed high and low surface of a sixth annular groove (L0) on the flat projecting wheel (5). The sixth control rod (L2) is fitted and move horizontally on an outer surface of the fix shaft (4).

The planetary gears of the second planetary gear groups (7) have a high and a low stage teeth surface respectively engaging the second pair of the sun gears (71) and (72), and the small sun gear (71) is controlled by a ninth detent (J0 and the large sun gear (72) by a tenth detent (K). When the small sun gear (71) is positioned by the ninth detent (J), the large sun gear (72) rotates quickly, and the ninth and the tenth detent (J) and (K) are oriented in the clockwise direction. Thus, only controlling the ninth detent (J) can select different speed proportion of the two sun gears (71), (72). The ninth detent (J) is controlled to become ON or OFF by rotating angle movement of the fourth sleeve (J1), which has a sloped notch (J11) for the fourth control rod (J2) to move the fourth sleeve (J1) which is then rotated to let a small notch (J11) press down or release the ninth detent (J) and the large notch (J13) alter the tenth detent (K) always ON. The fourth control rod (J2) is fitted on the fix shaft (4) and move horizontally, having the other end pulled by a fourth spring (J3) to closely contact and move horizontally along a mixed high and low surface of the fourth annular groove (J0) of the flat projecting wheel (5).

The planetary gear frame (7A) has the output end provided with an engage section facing a twelfth detent (M) of the power output means (10), which has the output end engage an inner wall of the wheel hub (1) to move together.

Next, as shown in FIG. 1, the first, the second, the third, the fourth, the fifth and the sixth control rod (B2), (C2), (E2), (H2), (J2) and (L2) respectively contact at a definite point on the first, the second, the third, the fourth, the fifth and the sixth annular grooves (B0), (C0), (E0), (H0), (J0) and (L0), and can move along the mixed high low surface of each of the annular grooves or stop. Each mixed high and low surface of each annular grooves are evenly divided according to the different speed stage with the surface recessed or not at various stages. In addition, a recovery spring 50 is provided outside of the flat projecting wheel (5) to elastically pull back the flat projecting wheel (5) after rotated.

Operating speed proportion altering routes performed by the all the detents (A), (B), (C), (D), (E), (F), (G), (H), (J), (K), (L) and (M) and all the control rods (B2), (C2), (E2), (H2), (J2) and (L2) are manifold. How to output 13 stages of different speed with the least number of the control rods will be described below according to the preferred embodiment.

When the second and the fourth control rods (C2) and (J2) are rotated by the flat projecting wheel (5) for a preset angle and moved horizontally, the third detent (C) of the small sun gear and the ninth detent (J) of first and the second set of the sun gears become OFF, and the rest detents, the second (B), the fifth (E), the eighth (H) and the eleventh (L) become ON to output the first stage of speed.

When the third detent (C) together with the second (B), the fifth (E), the eighth (H), and the eleventh (L) become ON, with only the ninth (J) OFF, the output is the second stage of speed.

When the ninth detent (J) together with the second (B), the third (C), the fifth (E), the eighth (H) and the eleventh (L) become ON, the output is the third stage of speed.

When the fifth detent (E) and the ninth (J) becomes OFF, with the second (B), the third (C), the eighth (H), and the eleventh (L) ON, the output is the fourth stage of speed.

When the ninth detent together with the second (B), the third (C), the eighth (H), and the eleventh become ON, with the fifth (E) OFF, the output is the fifth stage of speed.

When the second, the ninth and the fifth detent (B), (J) and (E) are OFF, with the third (C), the eighth (H), and the eleventh (L) ON, the output is the sixth stage of speed.

When the ninth detent (J) together with the third (C), the eighth (H), and the eleventh (L) become ON, with the second (B), and the fifth (E) OFF, the output is the seventh stage of speed.

When the third detent (C), the second (B) and the fifth (E) become OFF, with the ninth (J), the eighth (H) and the eleventh (L) ON, the output is the eighth stage of speed.

When the third detent (C), the ninth (J), the eleventh (L) become ON, with the eighth (H), the second (B) and the fifth (E) OFF, the output is the ninth stage of speed.

When the third detent (C), the second (B), the fifth (E), and the eighth (H) become OFF, with the ninth (J) and the eleventh (L) ON, the output is the tenth stage of speed.

When the second detent (B), the fifth (E), the eighth (H) and the eleventh (L) become OFF, with the third (C) and the ninth (J) ON, the output is the eleventh stage of speed.

When the second detent (B), the third (C), the fifth (E), the eighth (H), and eleventh (L) become OFF, with the ninth (J) only ON, the output is the twelfth stage of speed.

When the second detent (B), the third (C), the fifth (E), the eighth (H), the ninth (J), and the eleventh (L) become OFF, the output is the thirteenth stage of speed.

In short, the invention has a small dimensions, a light weight, a simple structure, easy to handle, and a unique rotatable flat projecting wheel to move plural control rods fitted on an outer surface of a fix shaft for separately controlling plural detents to become ON or OFF, added with an intermediate ring between two planetary gear groups and two internal gears for selecting the detents at the input and the output ends so that the inner derailleur may have manifold speed proportion output routes to choose.

While the preferred embodiment of the invention has been described above, it will be recognized and understood that various modifications may be made therein and the appended claims are intended to cover all such modifications that may fall within the spirit and scope of the invention.

I claim:

1. A bike inner derailleur comprising a wheel hub, a power input driving means, a speed change driving means, a fix shaft, a flat projecting wheel, a first planetary gear group, a first internal gear, a second planetary gear group, a second internal gear, an intermediate ring as main components; said wheel hub having a hollow central interior for said fix shaft to position therein longitudinally, said wheel hub rotatable with said fix shaft as a pivot, two pairs of two sun gears fitted around said fix shaft, said first planetary gear group located around an outer periphery of a first pair of said sun gears, said second planetary gear group located around an outer periphery of a second pair of said sun gears, said first planetary gears group engaging said first pair of said sun gears, said second planetary gear group engaging said second pair of said sun gears, each said planetary gear group located in and engaging said first and said second internal gear, said intermediate ring located between said first planetary gear group with said first internal gear and said second planetary gear group;

said power input driving means and said speed change driving means located at one side of said wheel hub, an output end of said power input driving means facing an input end of said first planetary gear group and an input end of said first internal gear, said power input driving means having a first detent on an outer edge of its output end to engage an engage section of said input end of said first internal gear, said power input driving means having an engage section on an inner edge of its output end to engage a second detent of an input end of a first planetary gear frame, said second detent controlled by a first sleeve fitted on said fix shaft and moving horizontally, said second detent moved to become OFF, wherein said second detent separates from said engage section of said power input driving means when said first sleeve moves horizontally, movement of said first sleeve carried out by a first control rod, an end of said first control rod closely contacting on a first annular groove of plural annular grooves of the same center of said flat projecting wheel, said end of said first control rod pulled by a first spring to closely contact and move horizontally along said first annular groove having a surface of mixed high and low sections, said speed change driving means of a speed change operating system rotatable to rotate said flat projecting wheel to change a rotating angle;

said first internal gear having annular inner teeth engaging a low stage teeth surface of said first planetary gear group and an output end facing an outer edge of an input end of said intermediate ring, a fifth detent controlling relation between said first internal gear and said intermediate ring; planetary gears of said first planetary gear group having a high and a low stage of teeth surface respectively engaging the first pair of said sun gears, a small one of said first pair of said sun gears controlled by a third detent, a large one of said first pair of said sun gears controlled by a fourth detent, said third and said fourth detent oriented to have the same clockwise direction;

said gear frame of said first planetary gear group having an engage section on an outer edge of an output end facing a sixth detent on an inner edge said input end of said intermediate ring; said outer edge of said input end of said intermediate ring having a fifth detent facing said output end of said first internal gear, said fifth detent moved by a third sleeve which is then moved by a third control rod moving horizontally, said third control rod having one end connected to said third sleeve and the other end pulled by a third spring to closely contact and move horizontally on a surface of mixed high and low sections of a third annular groove of said plural annular grooves on said flat projecting wheel;

said outer edge of said input end of said intermediate ring having a first combine groove for said fifth detent, said fifth detent becoming ON or OFF by control of said third sleeve at said output end of said first internal gear, said intermediate ring having a second combine groove for said sixth detent to let said sixth detent engage and move with said engage section of said output end of said first planetary gear frame owing to said fifth detent being OFF; an outer edge of an output end of said intermediate ring having a third combine groove to engage and move together with a seventh detent of an engage section formed on an input end of said second internal gear and an inner edge of an output end thereof having an engage section to engage and move together with an eighth detent of an input end of said second planetary gear frame;

said second planetary gear group having planetary gears provided with a high and a low stage of teeth surface to respectively engaging the second pair of said sun gears, a small one of said second pair of said sun gears controlled by a ninth detent and a large one thereof by a tenth detent, said ninth and said tenth detent oriented to have the same clockwise direction, said ninth detent controlled by angle movement of a fourth sleeve, said ninth sleeve rotated by a fourth control rod moving horizontally, said fourth control rod having an end pulled by a fourth spring to closely contact and move horizontally on a mixed high and low surface of a fourth annular groove of said flat projecting wheel;

said planetary gear frame of said second planetary gear group having an engage section formed on an output end to face a twelfth detent of a power output means, an output end of said power output means engaging an inner wall of said wheel hub.

2. The bike inner derailleur as claimed in claim 1, wherein said first, a second, said third, said fourth, a fifth and said sixth control rod respectively contact at a definite point on said first, a second, said third, said fourth, a fifth and a sixth annular groove of said flat projecting wheel, each said control rod respectively moving on said related annular groove or stopping thereon, said mixed high and low surface of each said annular groove evenly distributed according to the number of the stage of speed alteration.

3. The bike inner derailleur as claimed in claim 1, wherein a recovery spring is provided outside of said flat projecting wheel to give resilience to automatically let said flat projecting wheel return to its original position.

4. The bike inner derailleur as claimed in claim 1, wherein said first, a second said third, said fourth, a fifth and a sixth control rod are fitted on an outer surface of said fix shaft and move horizontally.

5. The bike inner derailleur as claimed in claim 1, wherein said fix shaft has at least two detent grooves and one recessed combine groove on its outer surface.

6. The bike inner derailleur as claimed in claim 1, wherein a second sleeve has a sloped groove for one end of a second control rod to hook, and said sloped groove permits said second sleeve to rotate by horizontal movement of said second control rod, a small notch provided at one side of said second sleeve and able to be moved down to press said third detent to become OFF, a large notch provided at the other side of said second sleeve and permitting said fourth detent to be always ON.

7. The bike inner derailleur as claimed in claim 1, wherein said fourth sleeve has a sloped groove for one end of said fourth control rod to hook, said fourth sleeve able to be rotated to permit a small notch of said fourth sleeve move down or release said ninth detent and a large notch thereof always ON.

8. The bike inner derailleur as claimed in claim 1, wherein said first and said second internal gears both have an engage section formed on said input end to receive external input power, forming a transmitting route for receiving said external power.

9. A bike inner derailleur comprising:
- a wheel hub having a hollow central interior for fitting a fix shaft therein, able to rotate with said fix shaft as a pivot;
- a power input driving means able to changeover power to a gear frame of a first planetary gear group or an input end of a first internal gear;
- a speed change driving means able to operate a flat projecting wheel to rotate for a preset angle with said fix shaft as a pivot;
- said fix shaft functioning as a pivot for said wheel hub, said power input driving means, said speed change driving means, said flat projecting wheel, said first planetary gear group, said first internal gear, a second planetary gear group, a second internal gear, an intermediate ring, and two pairs of sun gears to rotate, said fix shaft having at least two detent grooves and a recessed combine groove on an outer surface, said recessed groove used to fit control rods on the outer surface of said fix shaft;
- said flat projecting wheel having plural annular grooves with the same center, one end of each said control rod contacting on one of said annular grooves, each said annular groove having high and low sections mixed on each said annular groove according to the number of the stage of speed alteration; each said control rod fitted in a sleeve fitted around said fix shaft and moving horizontally or rotating, each said sleeve controlling opening and closing of a detent;
- said output end of said power input driving means may be connected to an input end of said first planetary gear group or said input end of said first internal gear; an input end of said intermediate ring may be connected an output of said first planetary gear group or an output end of said first internal gear by selection;
- said output end of said intermediate ring may connected to an input end of said second planetary gear group or an input end of said second internal gear an input end of an power output means may be connected to an output end of said second planetary gear group or an output end of said second internal gear.

10. The bike inner derailleur as claimed in claim 9, wherein said first and said second internal gears both have an engage section formed on said input end to receive external input power, forming a transmitting route for receiving said external power.

* * * * *